United States Patent [19]
Goldberg et al.

[11] Patent Number: 5,272,400
[45] Date of Patent: Dec. 21, 1993

[54] EXPULSIVE ICE DETECTOR

[75] Inventors: Joshua I. Goldberg, Woodbridge; Benjamin G. Lardiere, Jr., Milford, both of Conn.

[73] Assignee: Dataproducts New England, Inc., Wallingford, Conn.

[21] Appl. No.: 888,889

[22] Filed: May 26, 1992

[51] Int. Cl.$^5$ .............. H02K 3/04; B64D 15/00
[52] U.S. Cl. ..................... 310/10; 244/134 R
[58] Field of Search ........ 310/10; 244/134 R, 134 D; 340/580, 582; 73/170 R

[56] References Cited

U.S. PATENT DOCUMENTS

| | | | |
|---|---|---|---|
| 4,745,804 | 5/1988 | Goldberg et al. | 73/170 R |
| 4,894,569 | 1/1990 | Lardiere, Jr. et al. | 310/10 |
| 4,982,121 | 1/1991 | Lardiere, Jr. et al. | 310/10 |
| 5,107,154 | 4/1992 | Goldberg et al. | 310/10 |

Primary Examiner—Steven L. Stephan
Assistant Examiner—Matthew Nguyen
Attorney, Agent, or Firm—Bachman & LaPointe

[57] ABSTRACT

A method and apparatus for detecting the formation and build up of encrusted matter upon the outer surface of an electro-expulsive blanket utilizing the principles of stress and strain.

11 Claims, 2 Drawing Sheets

EXPULSIVE ICE DETECTOR

BACKGROUND OF THE INVENTION

The present invention relates to electro-expulsive separation devices sometimes referred to as expulsive blankets and relates in particular to such devices which are operable, in virtually explosive fashion, to shatter, separate and remove a solid body or crust forming a "build up" upon the outer surface of such devices.

Frequently such devices are used to expel ice from surfaces exposed to weather such as various components of aircraft, watercraft rigging and the like.

Representative examples of electro-expulsive devices are disclosed and described in U.S. Pat. Nos. 4,894,569, 4,982,121 and 5,107,154, whose disclosures are incorporated herein by this reference thereto. The attached Information Disclosure Statement includes copies of these patents.

While the above electro-expulsive devices are effective to shatter, separate and remove encrusted matter on the surface thereof, it is desirable to have a means and a method for monitoring or detecting the initial formation and the extent of "build up" of encrusted matter to avoid "firing" the devices unnecessarily, thereby avoiding wasting energy.

While a representative embodiment of the invention will be disclosed and described in connection with the formation and shedding of ice, it is to be understood that the principles of the invention are applicable to solid or encrusted matter generally.

That is, the present invention is not limited to the expulsion of ice nor is it limited to the expulsion of ice from aircraft.

Furthermore, while the present invention will be described in connection with said electro-expulsive devices, it is entirely within the spirit and scope of the present invention that the surface upon which encrusted matter accumulates be fabricated of metal, plastic, fiberglass reinforced plastic or other elastic materials stressed by known impulse generators such as solenoids, air pressure, powder actuated pistons and the like.

SUMMARY OF THE INVENTION

Consequently it is a principal feature of the present invention to provide a method for monitoring or detecting the formation of encrusted matter upon a surface capable of abrupt normal (perpendicular) acceleration and deceleration such as an expulsive blanket.

It is a further feature of the invention to provide a system for practicing the above method.

A still further feature of the invention is the provision of a monitor device which measures meaningful strain values when fired at a low energy level.

A further feature of the invention is the provision of a plurality of expulsive blanket sensors arranged ad seriatim thereby providing redundant sensing. That is, the expulsive blanket sensors are individual, side-by-side units, composite units or spaced units which are "fired" by individual electrical circuitry so that in the event of circuit failure in one unit the next adjacent unit will fire independently of the defective unit, thereby insuring reliable performance as described in said '154 patent.

It is a still further feature of the invention to use a low energy thrust for detecting the presence of encrusted material and a high energy thrust for shedding encrusted material thereby enhancing useful life by minimizing fatigue failure.

It is a further feature of the invention to monitor the degree of accumulation or thickness of encrusted matter formed upon the outer surface of the device.

A method embracing certain principles of the present invention may comprise the steps of noting the strain of a given surface of an expulsive blanket resulting from a known level of stress and comparing the strain of said surface when coated with encrusted matter under equivalent stress.

A system embracing certain other features of the invention may comprise an electro-expulsive blanket secured to a relatively rigid member, said blanket having an outer surface exhibiting a first strain value when the surface is clean and a second strain value when said surface is coated with an encrustation, both said strains resulting from equivalent stress, a strain gauge or strain sensor incorporated into said blanket, and means for measuring said first and second strain values whereby the difference in strain values are utilized to indicate the presence of encrusted material.

For purposes of further description claiming the present invention the electro-expulsive device may be termed an "expulsive blanket" having an inner surface and an outer or top surface.

BRIEF DESCRIPTION OF THE DRAWINGS

Other features and advantages of the present invention will become more apparent from an examination of the succeeding specification when read in conjunction with the appended drawings, in which.

DETAILED DESCRIPTION OF THE INVENTION

This invention involves a solid state sensor that uses an expulsive blanket to detect the presence of atmospheric ice forming on the outer surface of the blanket. The sensor provides discrete information and proportional information as to the presence of ice and its thickness. It also permits electronic interpolation of icing rate using recent changes in accreted ice thickness as a function of time.

Figure 1:
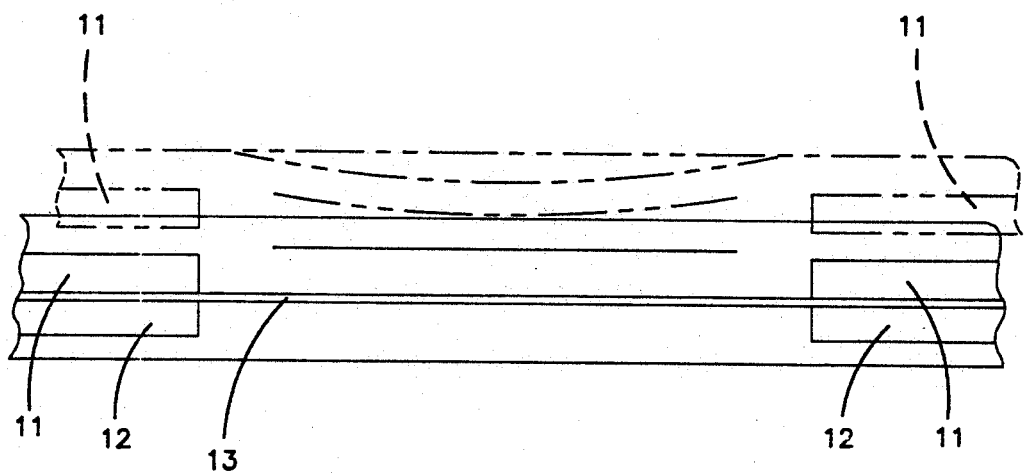
FIG. 1 shows, schematically, a segment of an electro-expulsive blanket of the type disclosed and described in said '569, '121 and '154 patents.

This invention is based on the physical principle of mechanical strain. The structure of an expulsive blanket requires alternate runs of copper 11 and 12, separated by elastomer 13. When an expulsive blanket is fired, the copper runs in the top layer 11 separate from the copper runs in the lower layer 12. Elastomer 13 that is between upper copper runs is pulled with these runs (normal to the blanket surface) as the two layers of copper separate. See FIGS. 1, 2, 5 and 6 of '121 patent. Since the restoring force springs are located in the space between the copper runs and since the elastomer stretches in tension, the space between copper runs forms a curve. FIG. 1 of this disclosure illustrates this curve disposed transversely of the runs 11 and 12. Since the restoring forces are initially uniform, and the tension in the elastomer is roughly uniform, the mathematical description of the curve formed is termed a "catenary".

This invention introduces a means to measure strain in the top surface or layer of the expulsive blanket. A piezo film sensor is one example of such means. This self-generating film is installed in the top layer of the blanket such that it partially or fully spans between at least two adjacent copper runs. When such an expulsive blanket is fired and no ice is present, the full "catenary" is produced. When atmospheric ice is present it bonds intimately to the blanket top surface. The additional strength of the ice drastically reduces the deformation of the elastomer (catenary) and this drastically reduces the signal generated by the piezo film sensor.

Figure 2:
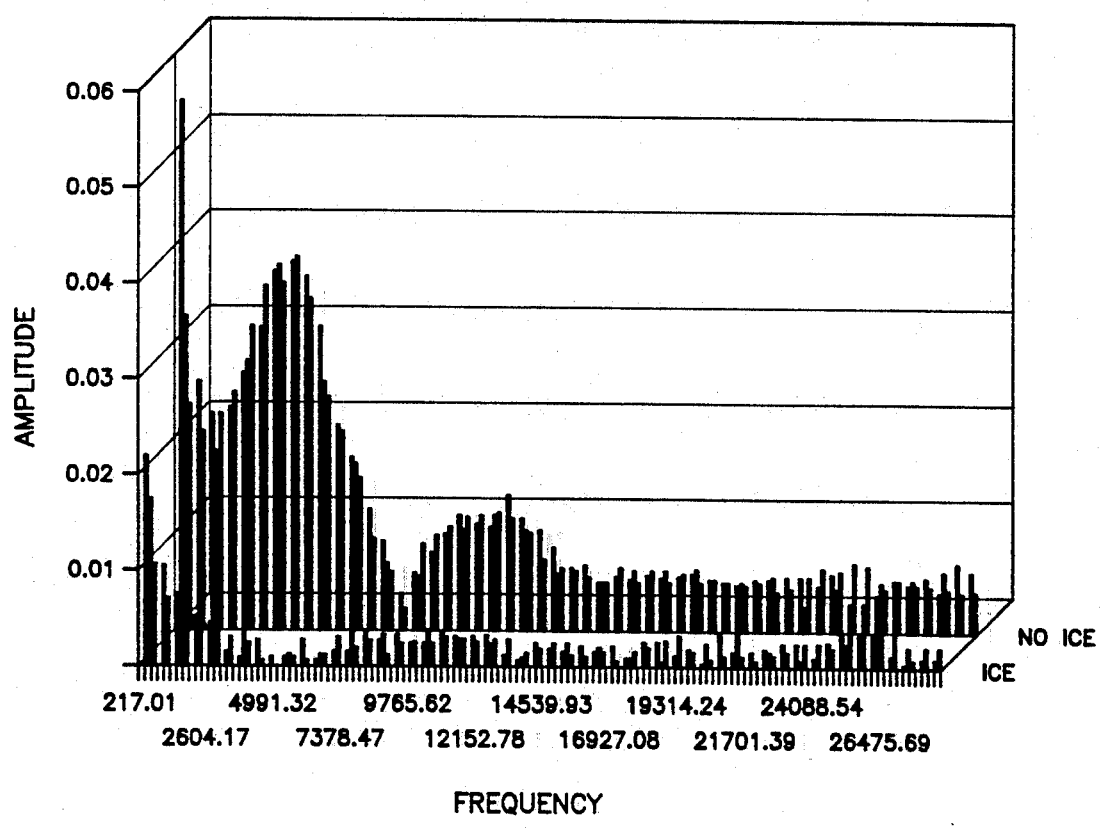
FIG. 2 shows graphically a typical spectral analysis of ice/no ice conditions as developed by strain sensor output.

By proper choice of blanket materials and thickness, and by monitoring the output of a suitable strain sensor, a dramatic difference in the electrical signature of ice and no ice can be noted. FIG. 2 of this disclosure shows the frequency spectrum of a typical ice and no ice comparison on a standard expulsive blanket.

A variety of electrical transducers can be used to convert elastomer strain to electrical variations. In the model of this invention, a self-generating organic film, termed a piezo film, has been used to generate a proportional electrical signal. Equally viable electrical transducer candidates are strain sensitive resistance film, suitably oriented foil strain gauges and strain sensitive capacitance film.

Figure 3:
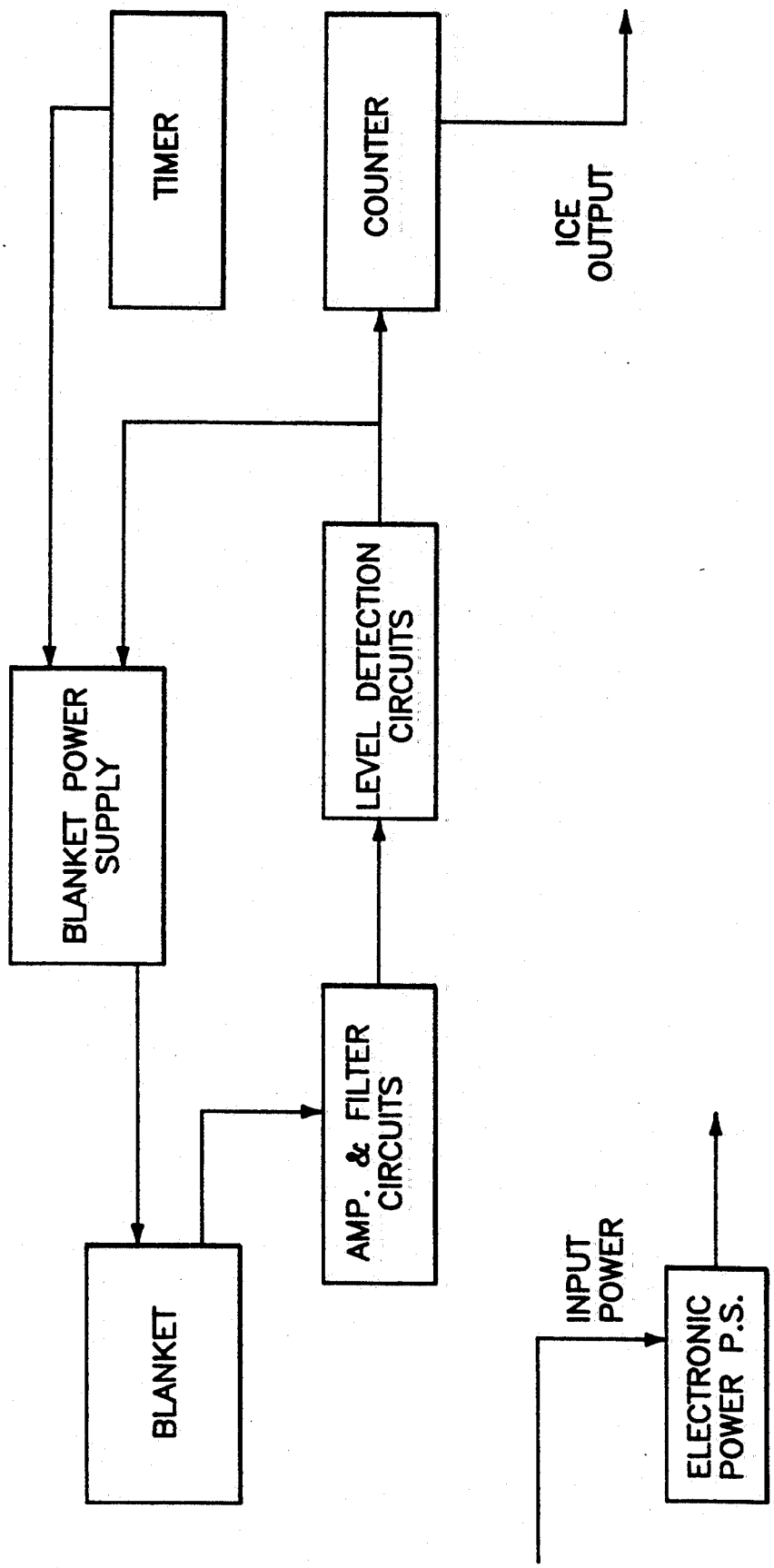
FIG. 3 is a block diagram of the detection circuitry.

FIG. 3 shows a block diagram of a typical embodiment of this invention. A blanket, modified only by the addition of a strain sensor, is installed flush with the surface to be monitored for ice accretion (rigid member, FIG. 1). Periodically the blanket is pulsed (fired), typically at the lowest level that will give satisfactory detection of the "catenary". The expulsive blanket and an integral sensor are sandwiched as shown. When the blanket is fired, and no ice is present, the strain sensor develops a large signal whose frequency characteristics are set by the mechanical properties of the blanket. When the blanket is fired, and ice is present, the strain sensor develops a much smaller signal whose frequency characteristics are set by the mechanical properties of the ice on the blanket. When the signal is deemed to represent ice, the electronic controller that fires the blanket is commanded to deliver full ice shedding current and thereby clear the accreted ice. This returns the sensor output to the no ice signature and thereby reduces the firing voltage.

This invention also permits redundant sensing of ice. Since different segments of expulsive blankets can be fired by different electronic systems, multiple, spatially diverse strain sensors can be installed in different places on an accreting surface. Each strain sensor permits independent ice detection and so provides redundant sensing.

This invention also permits sensing the thickness of ice with modest accuracy. In our data, ice is reliably sensed at a thickness of 0.02 to 0.03 inches of thickness. Since it is shed virtually instantaneously and without significantly changing the surface temperature of a blanket, accretion continues unabated while in icing conditions. Thus, the tenth time during an icing encounter that ice is shed from a blanket, corresponds to a total thickness of 0.2 to 0.3 inches on similar, but unshed, surfaces.

When the ice thickness is sufficient, a much greater current pulse is applied to the blanket. This causes a much more violent surface acceleration. These greater surface forces destroy the bond between accreted ice and sensor surface and expel all ice from the exposed surface of the detector. The cycle of detection and removal can now begin again.

The principle of using a low energy level to detect ice and a larger energy to shed ice also enhances the useful life of the sensor. Since the mechanical phenomena used in this ice detector subject the materials of the sensor to fatigue, each action that lowers the internal blanket stresses, enhances the blanket life. A typical expulsive blanket is capable of over 700,000 full deicing cycles. If the force is reduced to 25% of the deicing threshold, then life can be extended by a factor of many thousands.

FIG. 2 shows the time versus voltage output of a strain sensor sampled at an 18 microsecond rate (approximately 55.5 kilohertz) and analyzed using a computer program for its frequency content. The result is the equivalent amplitude of the time domain signal as a function of frequency. The low frequency amplitude of both plots corresponds to electronic signal processing characteristics. The major peak in the 2 to 5 kilohertz region corresponds to the basic blanket catenary response.

FIG. 3 shows a blanket pulsed regularly by a timer at a current that is sufficient to generate a catenary between copper runs, but at a value that is significantly less than is required to shed ice. The signal from the strain sensor is amplified and filtered and the level detection circuits determine the presence or absence of the large 2 to 5 kilohertz signal shown in FIG. 2. Filtering is used to reduce the demands on the dynamic range of the amplifiers and effectively improve their signal to noise ratio. When ice is present the characteristic strain signature is flat, and an icing event is recorded by the counter. The same signal is connected to the blanket power supply which then changes its operating mode. In the "ice detected" mode the blanket is fired at a higher level. The higher level causes enough motion to shed the accreted ice. This returns the level detection circuits to the "no ice detected" output. Whenever the counter reaches a present set number, a signal is sent to the user. The signal sent to the user corresponds an accretion of approximately n times 0.025 inches (where n is the preset number in the counter). After each user signal the process repeats if the sensor is still detecting ice.

The blanket has been drawn as a flat surface. It would function equally well as a simple or compound curved surface. It would function properly with its surface painted.

This detector would operate to find other materials that might accrete on its surface. It will also function with thin layers of paint coating its surface.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of detecting and expelling the presence of encrusted material accumulated upon an expulsive blanket where a portion of the blanket displays a characteristic value of strain under stress when free of encrusted material and displays a different value of strain when encrusted material is present, comprising the steps of:

exciting the expulsive blanket at a first energy level to create strain in said portion of said blanket, reading said strain value, comparing said read strain value to said characteristic strain value, and when said different strain value is observed indicating the presence of encrusted material, exciting the expulsive blanket at a second energy level sufficient to expel said encrusted material, wherein the excitement of the expulsive blanket returns automatically to the first energy level following expulsive excitement.

2. The method of claim 1 wherein the encrusted material is ice.

3. The method of claim 1 wherein the strain value is created by tensile stress.

4. The method of claim 1 wherein the first energy level is lower than the second energy level.

5. The method of claim 1 wherein the strain value obtained when the blanket is free of encrusted material is greater than the strain value when the blanket is encrusted.

6. The method of claim 1 wherein the excitement of the blanket at the first energy level is periodic.

7. The method of claim 1 wherein the strain values are monitored.

8. The method of claim 1 wherein said different strain value is signalled.

9. The method of claim 1 plus the step of arranging a plurality of expulsive blankets in a side by side configuration each having an independent exciting circuit to provide redundancy thereby increasing reliability of detection.

10. The method of claim 1 wherein the portion of the expulsive blanket in which the strain is created is a top surface of the blanket.

11. The method of claim 2 wherein ice of a thickness ranging from 0.02 to 0.03 inches develops said different strain value.

* * * * *